W. D. EATON.
CIRCUIT CLOSER OPERATOR.
APPLICATION FILED SEPT. 4, 1918.
1,311,763.
Patented July 29, 1919.
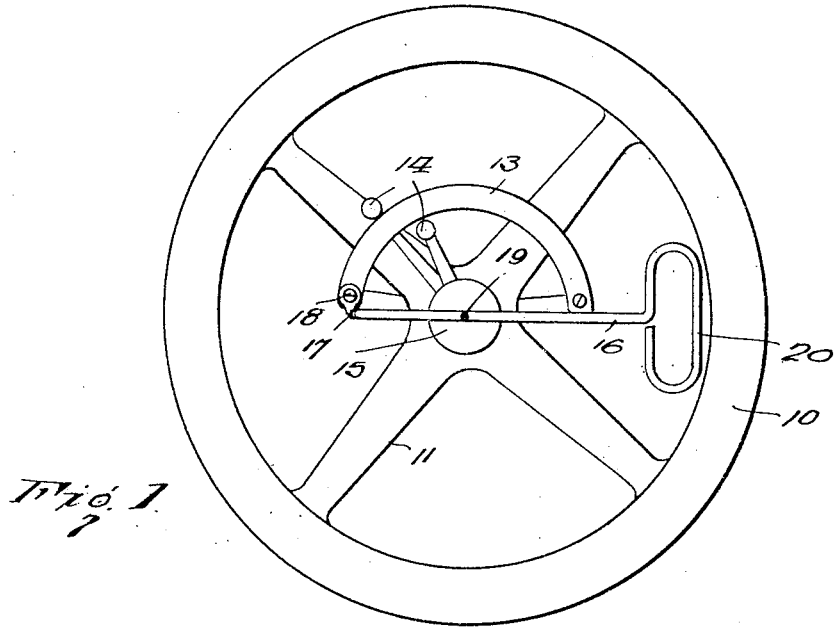
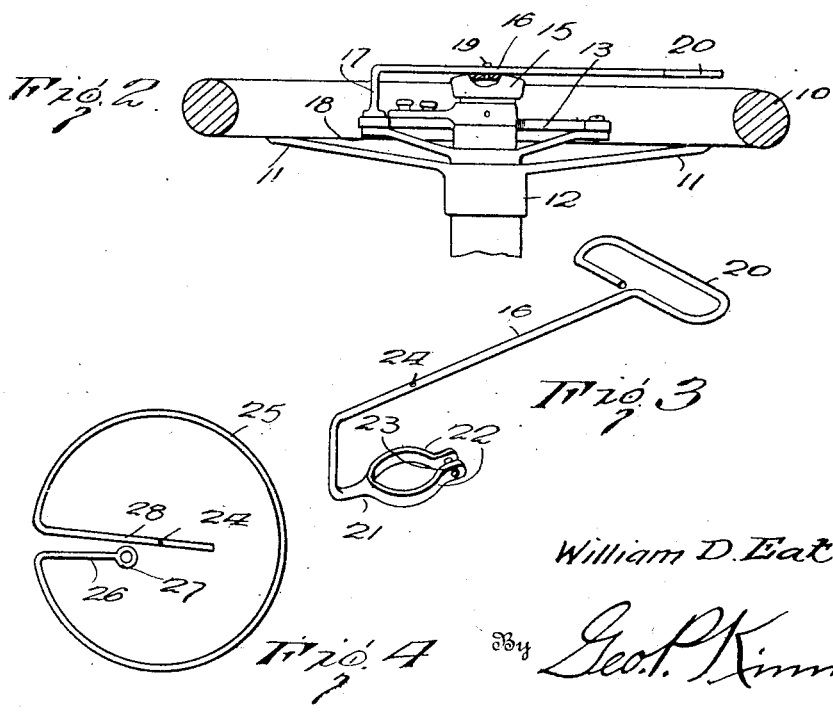
William D. Eaton, Inventor
By Geo. P. Kimmel, Attorney

UNITED STATES PATENT OFFICE.

WILLIAM D. EATON, OF GLEN ECHO, MARYLAND.

CIRCUIT-CLOSER OPERATOR.

1,311,763.   Specification of Letters Patent.   Patented July 29, 1919.

Application filed September 4, 1918. Serial No. 252,555.

*To all whom it may concern:*

Be it known that I, WILLIAM D. EATON, a citizen of the United States, residing at Glen Echo, in the county of Montgomery and State of Maryland, have invented certain new and useful Improvements in Circuit-Closer Operators, of which the following is a specification.

This invention relates to improvements in circuit closer devices and it is the principal object of the invention to provide a device for allowing the circuit closer included in the operating circuit of an electrical signal, such as commonly used on motor driven vehicles, to be operated thereby without the necessity of the removal of the driver's hands from the steering wheel or similar mechanism and in consequence, permitting the driver to retain positive control of the course of the vehicle.

Another and equally important object of the invention is to provide a device of the character mentioned which can be also used in connection with manually operable signals in order that the same may be operated by the driver with but little effort and without interfering with the control of the steering means.

Other objects will be in part obvious and in part pointed out hereinafter.

The improvements in the details and arrangement of parts will be apparent from an inspection of the accompanying drawings, when considered in connection with the specific description hereinafter contained and wherein preferred embodiments of the invention are shown for the purpose of imparting a full understanding thereof.

In the drawings:

Figure 1 is a top plan view of the steering wheel of a motor driven vehicle having the improved actuating device applied thereto, Fig. 2 is a vertical section therethrough, Fig. 3 is a perspective view of a slightly modified form of lever, and Fig. 4 is a top plan view of another modified form of the invention.

Having more particular reference to the drawings, in connection with which like reference characters will designate corresponding parts throughout the several views, 10 designates the steering wheel of a motor driven vehicle provided with the usual spokes 11 and sleeve 12 forming the axis of the wheel upon the steering post. A segment 13 is arranged above the wheel and secured rigidly with respect to the column and is provided with the ordinary control levers 14, while a circuit closer 15 is arranged upon the axis of the wheel and as will be understood, is included in the operating circuit of an electrical signal, whereby said circuit can be closed at will by a driver.

In accordance with the invention, I provide an actuating bar or lever 16 having one end bent downwardly or depending at right angles as shown at 17 and attached to the segment at 18. This bar is extended across the circuit closer 15 diametrically and is preferably connected at a suitable point with the same by means of a pin or like fastening device shown at 19; the free end of the bar or lever being formed with a hand grip or actuating part 20 which is arranged in a position convenient to be engaged by the hand of a driver for actuating the signal. In this connection, it is to be understood that the bar or lever 16 and the circuit closer resume their normal positions immediately subsequent to depression, thus opening the signaling circuit.

In the form of the invention as shown in Fig. 3, the bar or lever is of similar construction except that the same instead of being attached to the segment 13, has an inwardly extending bifurcated portion 21 providing a pair of spring clamping arms 22 adapted to be connected at their ends at 23, so as to be adjustably clamped to the steering post, the manipulation being the same as has been described in connection with the Figs. 1 and 2. To permit the connecting of the bar or lever to the circuit closer 15, an opening 24 may be formed therein to receive the connecting pin 19. In this connection, however, I desire to have it understood that I do not intend to limit myself to the specific forms of operating means herein shown and described, but may vary the same and their connection with the steering column of a vehicle, such as conditions or preference may dictate.

In the form of the invention shown in Fig. 4 of the drawings, the device is in the form of circular bar or lever 25 having an inwardly extending or radial portion 26 adapted as shown at 27 for engagement with the segment or post, while the opposite extremity is extended inwardly parallel thereto and above the same as shown at 28, so as to engage the push button. As this form of device extends continuously around the steering wheel, it can be operated irrespective of the position of the hands on the steering wheel, as it is thought will be readily understood.

I also desire to have it understood that the improved device can be used in connection with the operating means of mechanical signals, instead of the form of electric signal hereinbefore described, the bar or lever extending over such operating means in a manner to effect the transmission of motion thereto upon the rocking of the lever. In this way, it will be readily understood that the mechanical signal can be quite readily operated by a driver without interference with the control of the steering means.

Manifestly, the construction shown is capable of considerable modification, and such modification as is within the scope of my claim, I consider within the spirit of my invention.

I claim:

In combination with a column, a steering post, a steering wheel carried on the post, a circuit closer located centrally of the wheel, and a segment rigid relative to the column, a flexible bar disposed across the circuit closer and above the wheel and having one end bent angularly and secured to the segment, means for fastening the bar to the circuit closer so that the bar will normally hold the circuit closer in open position, and a handle formed on the other end of the bar and positioned near the rim of the wheel to permit depression of the bar whereby to close the circuit.

In testimony whereof, I affix my signature hereto.

WILLIAM D. EATON.